United States Patent
Rigau Resina et al.

(10) Patent No.: US 12,510,542 B1
(45) Date of Patent: Dec. 30, 2025

(54) CAPTURE ANTIBODY AND DETECTION ANTIBODY BINDING MMP9 PROTEIN

(71) Applicant: MiMARK Diagnostics, S.L., Barcelona (ES)

(72) Inventors: Marina Rigau Resina, Barcelona (ES);
Eva Colás Ortega, Barcelona (ES);
Maria De Martí Villalva, Barcelona (ES)

(73) Assignee: MİMARK Diagnostics, S.L., Barcelona (ES)

( * ) Notice: Subject to any disclaimer, the term of this patent is extended or adjusted under 35 U.S.C. 154(b) by 0 days.

(21) Appl. No.: 19/242,307

(22) Filed: Jun. 18, 2025

(51) Int. Cl.
*C07K 16/18* (2006.01)
*C07K 16/40* (2006.01)
*G01N 33/543* (2006.01)
*G01N 33/573* (2006.01)
*G01N 33/577* (2006.01)

(52) U.S. Cl.
CPC ............ *G01N 33/573* (2013.01); *C07K 16/40* (2013.01); *G01N 33/543* (2013.01); *G01N 33/577* (2013.01); *C07K 2317/565* (2013.01); *G01N 2333/96419* (2013.01)

(58) Field of Classification Search
None
See application file for complete search history.

(56) References Cited

U.S. PATENT DOCUMENTS 8,377,443 B2 * 2/2013 McCauley .............. A61P 35/04
530/388.1

* cited by examiner

*Primary Examiner* — Sharon X Wen
(74) *Attorney, Agent, or Firm* — Seed Intellectual Property Law Group LLP (57) ABSTRACT

Disclosed herein are antibodies binding to MMP9 protein, and use thereof for detecting or diagnosing endometrial cancer, preferably in a gynecological fluid, preferably uterine or cervical fluids.

13 Claims, 1 Drawing Sheet
Specification includes a Sequence Listing.

| Biomarker | Sensitivity | Specificity | NPV | PPV |
|---|---|---|---|---|
| 0.82 | 0.97 | 0.46 | 0.91 | 0.69 |

SEQUENCE LISTING

```
Sequence total quantity: 18
SEQ ID NO: 1            moltype = AA  length = 7
FEATURE                 Location/Qualifiers
source                  1..7
                        mol_type = protein
                        organism = synthetic construct
SEQUENCE: 1
TFLGKEY                                                                   7

SEQ ID NO: 2            moltype =     length =
SEQUENCE: 2
000

SEQ ID NO: 3            moltype =     length =
SEQUENCE: 3
000

SEQ ID NO: 4            moltype = AA  length = 10
FEATURE                 Location/Qualifiers
source                  1..10
                        mol_type = protein
                        organism = synthetic construct
SEQUENCE: 4
GSWDSSTAGI                                                               10
```

```
SEQ ID NO: 5            moltype = AA   length = 8
FEATURE                 Location/Qualifiers
source                  1..8
                        mol_type = protein
                        organism = synthetic construct
SEQUENCE: 5
GFTFSSHA                                                                  8

SEQ ID NO: 6            moltype = AA   length = 8
FEATURE                 Location/Qualifiers
source                  1..8
                        mol_type = protein
                        organism = synthetic construct
SEQUENCE: 6
IISSGSTP                                                                  8

SEQ ID NO: 7            moltype = AA   length = 17
FEATURE                 Location/Qualifiers
source                  1..17
                        mol_type = protein
                        organism = synthetic construct
SEQUENCE: 7
AKAADNGAGY NAAMIDA                                                       17

SEQ ID NO: 8            moltype = AA   length = 6
FEATURE                 Location/Qualifiers
source                  1..6
                        mol_type = protein
                        organism = synthetic construct
SEQUENCE: 8
QNIYSN                                                                    6

SEQ ID NO: 9            moltype =     length =
SEQUENCE: 9
000

SEQ ID NO: 10           moltype = AA   length = 9
FEATURE                 Location/Qualifiers
source                  1..9
                        mol_type = protein
                        organism = synthetic construct
SEQUENCE: 10
QCTYYDSAT                                                                 9

SEQ ID NO: 11           moltype = AA   length = 9
FEATURE                 Location/Qualifiers
source                  1..9
                        mol_type = protein
                        organism = synthetic construct
SEQUENCE: 11
GFSFSRGDW                                                                 9

SEQ ID NO: 12           moltype = AA   length = 8
FEATURE                 Location/Qualifiers
source                  1..8
                        mol_type = protein
                        organism = synthetic construct
SEQUENCE: 12
IYTDNSGS                                                                  8

SEQ ID NO: 13           moltype = AA   length = 11
FEATURE                 Location/Qualifiers
source                  1..11
                        mol_type = protein
                        organism = synthetic construct
SEQUENCE: 13
ARGDTNYHWN L                                                             11

SEQ ID NO: 14           moltype = AA   length = 103
FEATURE                 Location/Qualifiers
source                  1..103
                        mol_type = protein
                        organism = synthetic construct
SEQUENCE: 14
ALTQPSSVST NPGETVKITC SGGTYSYGWY QQKSPGSAPV SVIYDNTNRP SDIPSRFSGS         60
KSGSTATLTI TGVQADDEAV YFCGSWDSST AGIFGAGTTL TVL                          103

SEQ ID NO: 15           moltype = AA   length = 124
```

```
FEATURE                 Location/Qualifiers
source                  1..124
                        mol_type = protein
                        organism = synthetic construct
SEQUENCE: 15
AVTLDESGGG LQTPGGALSL VCKASGFTFS SHAMMWVRQA PGKGLEWVAG IISSGSTPYY    60
APAVKGRATI SRDNGQSTVR LQLNNLRAED SATYYCAKAA DNGAGYNAAM IDAWGHGTEV   120
IVSS                                                                124

SEQ ID NO: 16           moltype = AA  length = 107
FEATURE                 Location/Qualifiers
source                  1..107
                        mol_type = protein
                        organism = synthetic construct
SEQUENCE: 16
DGVMTQTPAS VEAAVGGTVT IKCQASQNIY SNLAWYQQKP GHPPKVLIYD ASDLASGVPS    60
RFSGSGSGTD FTLIIRDLEC ADAATYYCQC TYYDSATFGG GTEVVVK                 107

SEQ ID NO: 17           moltype = AA  length = 118
FEATURE                 Location/Qualifiers
source                  1..118
                        mol_type = protein
                        organism = synthetic construct
SEQUENCE: 17
QEQLEESGGD LVKPGASLTL TCTASGFSFS RGDWICWVRQ APGKGLEWIA CIYTDNSGSY    60
YARWAKGRFT ISKTSSTTVT LQMTSLTAAD TATYFCARGD TNYHWNLWGP GTLVTISS     118

SEQ ID NO: 18           moltype = AA  length = 716
FEATURE                 Location/Qualifiers
source                  1..716
                        mol_type = protein
                        organism = synthetic construct
SEQUENCE: 18
MSLWQPLVLV LLVLGCCFAA PRQRQSTLVL FPGDLRTNLT DRQLAEEYLY RYGYTRVAEM    60
RGESKSLGPA LLLLQKQLSL PETGELDSAT LKAMRTPRCG VPDLGRFQTF EGDLKWHHHN   120
ITYWIQNYSE DLPRAVIDDA FARAFALWSA VTPLTFTRVY SRDADIVIQF GVAEHGDGYP   180
FDGKDGLLAH AFPPGPGIQG DAHFDDDELW SLGKGVVVPT RFGNADGAAC HFPPIFEGRS   240
YSACTTDGRS DGLPWCSTTA NYDTDDRFGF CPSERLYTQD GNADGKPCQF PPIFQGQSYS   300
ACTTDGRSDG YRWCATTANY DRDKLFGFCP TRADSTVMGG NSAGELCVFP FTFLGKEYST   360
CTSEGRGDGR LWCATTSNFD SDKKWGFCPD QGYSLFLVAA HEFGHALGLD HSSVPEALMY   420
PMYRFTEGPP LHKDDVNGIR HLYGPRPEPE PRPPTTTTPQ PTAPPTVCPT GPPTVHPSER   480
PTAGPTGPPS AGPTGPPTAG PSTATTVPLS PVDDACNVNI FDAIAEIGNQ LYLFKDGKYW   540
RFSEGRGSRP QGPFLIADKW PALPRKLDSV FEERLSKKLF FFSGRQVWVY TGASVLGPRR   600
LDKLGLGADV AQVTGALRSG RGKMLLFSGR RLWRFDVKAQ MVDPRSASEV DRMFPGVPLD   660
THDVFQYREK AYFCQDRFYW RVSSRSELNQ VDQVGYVTYD ILQCPEDGSG HHHHHH       716
```

CAPTURE ANTIBODY AND DETECTION ANTIBODY BINDING MMP9 PROTEIN

REFERENCE TO AN ELECTRONIC SEQUENCE LISTING

The contents of the electronic sequence listing (660177_401_Sequence_Listing.xml; Size: 15,542 bytes; and Date of Creation: May 13, 2025) is herein incorporated by reference in its entirety.

FIELD OF THE INVENTION

The present invention refers to the medical field. Particularly, the present invention refers to antibodies binding MMP9 protein, and their use for the diagnosis and/or prognosis of endometrial cancer in a biological sample obtained from the sample, preferably in gynecological fluids.

STATE OF THE ART

Endometrial cancer is one of the most common gynecological malignancies, with an increasing incidence worldwide. Despite advances in treatment, early detection remains a challenge, leading to delays in diagnosis and poor prognoses in advanced cases. Current diagnostic methods rely on imaging techniques and histopathological analysis of endometrial biopsies, which are often invasive and usually performed only after the onset of symptoms. Consequently, there is an unmet medical need for novel, non or minimally-invasive, and efficient strategies to detect endometrial cancer at an early stage.

Matrix metalloproteinase 9 (MMP-9) (UniProt ID: P14780) is a key enzyme involved in the degradation of extracellular matrix components, playing a crucial role in tumor progression, invasion, and metastasis. Elevated levels of MMP-9 have been detected in various cancers, including endometrial cancer, and have been associated with poor prognosis and increased metastatic potential. Given its role in tumor biology, MMP-9 has been explored as a potential biomarker for cancer diagnosis and prognosis. However, the lack of specific and reliable detection methods limits its clinical application.

The development of novel antibodies against MMP-9 could provide a breakthrough in endometrial cancer diagnostics. Such antibodies could be utilized in immunoassays, imaging techniques, or biosensors to enable early and non-invasive detection of MMP-9 levels in patient samples. By improving the specificity and sensitivity of MMP-9 detection, these antibodies could address the existing diagnostic gap and contribute to better patient outcomes.

Despite the recognition of MMP-9 as a potential biomarker, there remains a need for the identification and development of antibodies with high specificity and affinity for MMP-9, for the diagnosis and/or prognosis of endometrial cancer, particularly in gynecological fluids. Gynecological fluids encompass a variety of secretions produced within the female reproductive tract, each with distinct characteristics and functions. Among them, uterine fluid, commonly collected through aspiration, and cervical secretions, commonly collected through cervical swabs, are particularly relevant for clinical and research purposes. Particularly, a uterine sample refers for instance to the liquid present in the endometrial cavity, composed of secretions from endometrial glands and exudates from plasma or surrounding tissues. This sample may contain epithelial cells, immune cells, exosomes, secreted proteins, and hormones, among other components. Its analysis provides valuable insights into fertility, endometrial health, and conditions such as endometriosis, intrauterine infections, or endometrial cancer. Uterine samples are typically collected through endometrial aspiration or uterine lavage. On the other hand, cervical samples, mainly composed of secretions from cervical glands and, to a lesser extent, other sources, can be obtained using a cervical swab. These contain a mixture of cervical mucus, exfoliated epithelial cells, and microbiota, reflecting both a woman's hormonal status and the presence of infections or inflammation.

Existing antibody-based detection methods are limited by cross-reactivity, low sensitivity, or inadequate reproducibility; or are not particularly adapted to the identification of MMP9 in gynecological samples, such as uterine or cervical fluids.

Therefore, the discovery of novel antibodies with enhanced properties could significantly improve endometrial cancer detection and provide new avenues for patient management.

The present invention is focused on solving this problem and provide innovative antibodies binding MMP9, for the detection of endometrial cancer, particularly in gynecological samples, such as uterine or cervical fluids.

DESCRIPTION OF THE INVENTION

Brief Description of the Invention

The present invention refers to antibodies binding MMP9 protein, and their use for diagnosing and/or prognosing endometrial cancer, in a biological sample obtained from the female genital tract, preferably gynecological fluids, such as uterine or cervical fluids.

Particularly, the inventors of the present invention have identified a capture antibody that plays a pivotal role in binding to the target antigen MMP9 which may be present in the biological sample obtained from the subject. The capture antibody is immobilized on the surface of the immunoassay plate, typically coating the wells to ensure effective antigen anchoring during the assay. This immobilization is crucial, as it facilitates subsequent detection and quantification steps. The primary function of the capture antibody is to "capture" the antigen from the sample by binding to a specific epitope of MMP9, which has been precisely identified in the present invention (SEQ ID NO: 1). Once bound, the antigen remains securely attached to the plate, enabling precise detection. This step is fundamental for instance in the sandwich ELISA, as it establishes a stable foundation for further analysis. In the present invention, the antibody hereinafter identified as 3C2 #8 or MMP9_3C2 #8 serves as the capture antibody. It binds MMP9, ensuring efficient antigen capture and immobilization on the immunoassay plate, which enhances the assay's accuracy and reliability.

On the other hand, the inventors of the present invention have identified a detector antibody that is responsible for recognizing and binding to the antigen MMP9 that has already been captured by the capture antibody. This step is essential for detecting the presence of MMP9 and quantifying it accurately. To facilitate detection, the detector antibody is typically labelled with a marker such as biotin or an enzyme like horseradish peroxidase (HRP). This labelling allows for signal amplification and visualization. After the antigen is captured by the capture antibody, the detector antibody binds to a distinct epitope on MMP9, enabling a secondary detection mechanism. In the present invention, the antibody hereinafter identified as 7E10 #18 or MMP9_7E10 #18 functions as the detector antibody. Following the capture of MMP9 by MMP9_3C2 #8, the MMP9_7E10 #18 binds specifically to another epitope of MMP9. This detector antibody is biotinylated, streptavidin conjugate (for instance Streptavidin-HRP) will bind to the biotin label on MMP9_7E10 #18, facilitating antigen detection. Streptavidin-HRP catalyzes the reaction of substrates such as TMB, producing a detectable colour change that correlates with the presence of MMP9 in the sample.

Alternatively, a secondary antibody might be present. The secondary antibody does not directly bind the antigen, but it instead binds the detector antibody, further amplifying the detection signal. This amplification is achieved by conjugating the secondary antibody to an enzyme (such as HRP) or a fluorophore, increasing the assay's sensitivity. This strategic use of capture, detector, and secondary antibodies ensures a robust and reliable immunoassay for detecting MMP9, with high specificity and enhanced signal detection.

In many immunoassay formats, using only the capture and detector antibodies can be sufficient, especially if the detector antibody is directly conjugated with an enzyme like HRP or a fluorophore. This is known as a direct sandwich ELISA and can simplify the assay while reducing variability. However, incorporating a secondary antibody offers advantages such as signal amplification, increased sensitivity, and flexibility in detection methods (e.g., biotin-streptavidin systems).

So, the first embodiment of the present invention refers to an immunoassay test device or kit that comprises a capture antibody (3C2 #8 or MMP9_3C2 #8) that specifically binds an epitope of the MMP9 protein, wherein the antibody comprises specific complementarity-determining regions (CDRs). The light chain variable region (VL) comprises LCDR1 (SEQ ID NO: 2), LCDR2 (SEQ ID NO: 3), and LCDR3 (SEQ ID NO: 4), while the heavy chain variable region (VH) comprises HCDR1 (SEQ ID NO: 5), HCDR2 (SEQ ID NO: 6), and HCDR3 (SEQ ID NO: 7); or any conservative amino acid substitution in the CDR sequences. The device further includes a detection antibody that specifically binds a different epitope of the MMP9 protein and a solid support.

LCDR1 (SEQ ID NO: 2): TYS.
LCDR2 (SEQ ID NO: 3): DNT.
LCDR3 (SEQ ID NO: 4): GSWDSSTAGI.
HCDR1 (SEQ ID NO: 5): GFTFSSHA.
HCDR2 (SEQ ID NO: 6): IISSGSTP.
HCDR3 (SEQ ID NO: 7): AKAADNGAGYNAAMIDA.

The sequence of the light chain variable region (VL) is as follows:

(SEQ ID NO: 14)
ALTQPSSVSTNPGETVKITCSGTYSYGWYQQKSPGSAPVSVIYDNTNR

PSDIPSRFSGSKSGSTATLTITGVQADDEAVYFCGSWDSSTAGIFGAGT

TLTVL

The sequence of the heavy chain variable region (VH) is as follows:

(SEQ ID NO: 15)
AVTLDESGGGLQTPGGALSLVCKASGFTFSSHAMMWVRQAPGKGLEWVA

GIISSGSTPYYAPAVKGRATISRDNGQSTVRLQLNNLRAEDSATYYCAK

AADNGAGYNAAMIDAWGHGTEVIVSS.

Note: The CDRs of each chain are highlighted in bold.

In a preferred embodiment, the present invention comprises a specific detection antibody, preferably a detection antibody (7E10 #18 or MMP9_7E10 #18) that comprises a light chain variable region (VL) with LCDR1 (SEQ ID NO: 8), LCDR2 (SEQ ID NO: 9), and LCDR3 (SEQ ID NO: 10), and a heavy chain variable region (VH) with HCDR1 (SEQ ID NO: 11), HCDR2 (SEQ ID NO: 12), and HCDR3 (SEQ ID NO: 13), or any conservative amino acid substitution in the CDR sequences, allowing for precise binding to the MMP9 protein.

LCDR1 (SEQ ID NO: 8): QNIYSN.
LCDR2 (SEQ ID NO: 9): DAS.
LCDR3 (SEQ ID NO: 10): QCTYYDSAT.
HCDR1 (SEQ ID NO: 11): GFSFSRGDW.
HCDR2 (SEQ ID NO: 12): IYTDNSGS.
HCDR3 (SEQ ID NO: 13): ARGDTNYHWNL.

The sequence of the light chain variable region (VL) is as follows:

(SEQ ID NO: 16)
DGVMTQTPASVEAAVGGTVTIKCQASQNIYSNLAWYQQKPGHPPKVLIY

DASDLASGVPSRFSGSGSGTDFTLIIRDLECADAATYYCQCTYYDSATF

GGGTEVVVK.

The sequence of the heavy chain variable region (VH) is as follows:

(SEQ ID NO: 17)
QEQLEESGGDLVKPGASLTLTCTASGFSFSRGDWICWVRQAPGKGLEWI

ACIYTDNSGSYYARWAKGRFTISKTSSTTVTLQMTSLTAADTATYFCAR

GDTNYHWNLWGPGTLVTISS.

Note: The CDRs of each chain are highlighted in bold.

In another embodiment, the capture antibody is immobilized on a solid support to facilitate the binding of the MMP9 protein, and the detection antibody is labelled for signal detection, ensuring the effective identification of the target protein within a biological sample.

In yet another embodiment, to enhance signal detection, the detection antibody is labelled or conjugated to an enzyme, a fluorophore, a coloured synthetic polymer particle, or a colloidal metal particle, particularly a chemiluminescent agent, a colorimetric agent, fluorescent agent, bioluminescent agent, an energy transfer agent or a radioisotope. These labelling options provide flexibility in the detection method used in the immunoassay test device.

The detection antibody may be labelled with a reporter molecule, preferably selected from biotin, an enzyme, a fluorophore, or a radioactive isotope. The inclusion of these reporter molecules allows for various detection strategies depending on the specific requirements of the assay.

In an additional embodiment, the present invention comprises a secondary antibody that binds the detection antibody, thereby amplifying the detection signal and increasing the assay sensitivity.

The present invention further refers to a method, particularly to an in vitro method for diagnosing and/or prognosing endometrial cancer that comprises assessing the presence or amount of MMP9 in a biological sample. The method includes contacting the sample with the immunoassay test device or kit of the invention, which detects and quantifies the target protein MMP9.

In a preferred embodiment, the identification of an MMP9 level higher than a pre-established threshold value measured in control subjects who are not suffering from endometrial cancer, is an indication that the subject is suffering from endometrial cancer.

In a particular embodiment, the present invention refers to the sample type. The biological sample is preferably used for the detection of endometrial cancer in gynecological samples, such as uterine or cervical fluids or biopsies. This sample type provides a reliable source for detecting MMP9 levels, facilitating early diagnosis and prognosis of endometrial cancer.

The present invention also refers to specific antibody sequences, particularly to an isolated antibody that specifically binds an epitope of the MMP9 protein. The antibody may comprise:

A light chain variable region (VL) with LCDR1 (SEQ ID NO: 2), LCDR2 (SEQ ID NO: 3), and LCDR3 (SEQ ID NO: 4), and a heavy chain variable region (VH) with HCDR1 (SEQ ID NO: 5), HCDR2 (SEQ ID NO: 6), and HCDR3 (SEQ ID NO: 7), or any conservative amino acid substitution in the CDR sequences, allowing for precise and selective binding to the target protein MMP9; or A light chain variable region (VL) comprises LCDR1 (SEQ ID NO: 8), LCDR2 (SEQ ID NO: 9), and LCDR3 (SEQ ID NO: 10), while the heavy chain variable region (VH) comprises HCDR1 (SEQ ID NO: 11), HCDR2 (SEQ ID NO: 12), and HCDR3 (SEQ ID NO: 13), or any conservative amino acid substitution in the CDR sequences, allowing for precise and selective binding to the target protein MMP9.

In yet another embodiment, the present invention refers to epitope specification.

The capture antibody binds an epitope comprising SEQ ID NO: 1 or a sequence with at least 95% identity with the SEQ ID NO: 1.

In a further embodiment, the present invention refers to the antibody type. The isolated antibody may be a conventional or a recombinant antibody. It may be polyclonal or monoclonal, preferably monoclonal. In a preferred embodiment, the monoclonal antibody is produced using recombinant technologies. These formats provide different advantages in terms of production, specificity, and therapeutic potential.

In an additional embodiment, the present invention refers to the general epitope definition and an isolated antibody is provided that binds an epitope consisting of SEQ ID NO: 1, or a sequence with at least 95% identity with the SEQ ID NO: 1. This embodiment ensures versatility in antibody selection while preserving strong binding affinity.

Moreover, the present invention refers to the epitope as a separate entity, particularly an epitope consisting of SEQ ID NO: 1 or a sequence having at least 95% identity with the SEQ ID NO: 1. This embodiment provides a defined target sequence for developing additional immunological reagents and diagnostic tools.

The last embodiment of the present invention refers to an antibody obtained by: a) administering the immunogen comprising the antigen derived from SEQ ID NO: 18 to a non-human animal in order to induce the generation of antibodies, and b) obtaining the antibodies thus generated.

So, the present invention also refers to an in vitro method for the diagnosis and/or prognosis of endometrial cancer which comprises assessing the presence or the amount of MMP9 in a biological sample obtained from the subject, wherein the method comprises contacting the sample with the immunoassay test device or kit of the invention which comprises an antibody obtained by: a) administering the immunogen comprising the antigen SEQ ID NO: 18 to an non-human animal in order to induce the generation of antibodies, and b) obtaining the antibodies thus generated.

For the purpose of the present invention the following terms are defined:

The term "antibody" refers to a molecule comprising at least one immunoglobulin domain that binds to, or is immunologically reactive with, a particular target. The term includes whole antibodies and any antigen binding portion or single chains thereof and combinations thereof; for instance, the term "antibody" in particular includes bivalent antibodies and bivalent bispecific antibodies. A typical type of antibody comprises at least two heavy chains ("HC") and two light chains ("LC") interconnected by disulfide bonds.

Each "heavy chain" comprises a "heavy chain variable domain" (abbreviated herein as "VH") and a "heavy chain constant domain" (abbreviated herein as "CH"). The heavy chain constant domain typically comprises three constant domains, CH1, CH2, and CH3.

Each "light chain" comprises a "light chain variable domain" (abbreviated herein as "VL") and a "light chain constant domain" ("CL"). The light chain constant domain (CL) can be of the kappa type or of the lambda type. The VH and VL domains can be further subdivided into regions of hypervariability, termed Complementarity Determining Regions ("CDR"), interspersed with regions that are more conserved, termed "framework regions" ("FW").

Each VH and VL is composed of three CDRs and four FWs, arranged from amino-terminus to carboxy-terminus in the following order: FW1, CDR1, FW2, CDR2, FW3, CDR3, FW4. The present disclosure inter alia presents VH and VL sequences as well as the subsequences corresponding to CDR1, CDR2, and CDR3.

The precise amino acid sequence boundaries of a given CDR can be determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), Al-Lazikani et al., (1997) JMB 273,927-948 ("Chothia" numbering scheme).

Accordingly, a person skilled in the art would understand that the sequences of FW1, FW2, FW3 and FW4 are equally disclosed. For a particular VH, FW1 is the subsequence between the N-terminus of the VH and the N-terminus of H-CDR1, FW2 is the subsequence between the C-terminus of H-CDR 1 and the N-terminus of H-CDR2, FW3 is the subsequence between the C-terminus of H-CDR2 and the N-terminus of H-CDR3, and FW4 is the subsequence between the C-terminus of H-CDR3 and the C-terminus of the VH. Similarly, for a particular VL, FW1 is the subsequence between the N-terminus of the VL and the N-terminus of L-CDR1, FW2 is the subsequence between the C-terminus of L-CDR1 and the N-terminus of L-CDR2. FW3 is the subsequence between the C-terminus of L-CDR2 and the N-terminus of L-CDR3, and FW4 is the subsequence between the C-terminus of L-CDR3 and the C-terminus of the VL.

The variable domains of the heavy and light chains contain a region that interacts with a binding target, and this region interacting with a binding target is also referred to as an "antigen-binding site" or "antigen-binding site" herein. The constant domains of the antibodies can mediate the binding of the antibody to host tissues or factors, including various cells of the immune system (e.g., effector cells) and the first component (C1q) of the classical complement system. Exemplary antibodies of the present disclosure include typical antibodies, but also bivalent fragments and variations thereof such as an F(ab')2.

As used herein, the term "antibody" refers to any immunoglobulin molecule comprising at least one antigen-binding site. This term encompasses intact polyclonal antibodies, monoclonal antibodies (including those produced by hybridoma technology or by recombinant methods), recombinant antibodies, bivalent antibody fragments (such as F(ab')2), multispecific antibodies (e.g., bispecific antibodies), chimeric antibodies, humanized antibodies, human antibodies, and any modified antibody or antibody fragment retaining specific antigen recognition capability.

An antibody can be of any the five major classes (isotypes) of immunoglobulins: IgA, IgD, IgE, IgG, and IgM, or subclasses thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well-known subunit structures and three-dimensional configurations. Antibodies can be naked or conjugated to other molecules such as therapeutic agents or diagnostic agents to form immunoconjugates.

The VL and VH of the targeting moiety defined herein may be humanized. In the humanization process, the framework regions of the variable region of a targeting moiety may be modified, whereas the CDRs are maintained constant. By "maintained constant" it is referred that, while the framework regions of the targeting moiety can vary (for instance, they can be different depending on whether it is a murine ScFv or a humanized ScFv), the sequences belonging to the CDRs are not changed or are invariable.

In an embodiment, the targeting moiety is an antibody, F(ab')2, Fab, preferably scFv, or scFab, comprising a VL and a VH domains, wherein the VL domain comprises a sequence having at least 80%, 81%, 82%, 83%, 84%, 85%, 86%, 87%, 88%, 89%, 90%, 91%, 92%, 93%, 94%, 95%, 96%, 97%, 98%, 99% or 100% sequence identity to the VL domain sequence herein disclosed, wherein the CDRs comprised in said VL are maintained constant (i.e., non-variable); and wherein the VH domain comprises a sequence having at least 80%, 81%, 82%, 83%, 84%, 85%, 86%, 87%, 88%, 89%, 90%, 91%, 92%, 93%, 94%, 95%, 96%, 97%, 98%, 99% or 100% sequence identity to VH domain herein disclosed, wherein the CDRs comprised in said VH are maintained constant.

The term "comprising" means "including", but not limited to what follows the term "comprising". Thus, the use of the term "comprising" indicates that the elements listed are necessary or mandatory, but that other elements are optional and may or may not be present.

The term "consisting of" means "including" but is limited to what follows the term "consisting of". Thus, the term "consists of" indicates that the elements listed are mandatory, and that other elements may not be present.

The expression "pre-established threshold value measured in control subjects who are not suffering from endometrial cancer" refers to a specific reference value or cutoff point derived from measurements taken in individuals who are not suffering from endometrial cancer. This value serves as a baseline for comparison to assess the presence or level of the biomarker. The pre-established threshold is typically determined using standard diagnostic methods or statistical techniques, such as mean, median, or other population-based metrics, obtained from a control group of healthy individuals, who are not suffering from endometrial cancer. A person skilled in the art would be familiar with established methodologies for calculating such a threshold value, including the selection of appropriate control groups, statistical analysis, and interpretation of the results to ensure the threshold accurately reflects the normal range for the biomarker or condition in question.

A "solid support" refers to a physical surface or material onto which molecules such as antigens, antibodies, or other biomolecules are immobilized. This surface plays a critical role in facilitating the detection of specific interactions, as it provides a stable and accessible platform for the binding of target molecules during the assay. The solid support essentially serves as the anchor for the components of the immunoassay, ensuring that they remain in place during the process of detection. The solid support must be chemically compatible with the biomolecules being analyzed, as it needs to interact effectively with them to ensure proper immobilization and subsequent detection. The physical properties of the support material are also important, as they must be able to withstand the conditions of the assay, such as temperature, pH, and the presence of various solvents or buffers. Examples of solid supports are: Microtiter Plates (Polystyrene Plates), Magnetic Beads, Nitrocellulose Membranes, Polyvinylidene Fluoride (PVDF) Membranes, Nanosurfaces (Gold or Silver Nanoparticles) or Glass Slides or Wells.

A "capture antibody" is an antibody specifically designed to bind and immobilize a target analyte (e.g., a protein, biomarker, or antigen) onto a "solid support" in immunoassays such as ELISA, biosensors, or immunoprecipitation assays. This antibody serves as the first layer in a sandwich assay or a coating antibody in direct detection methods, facilitating the capture of the analyte for further detection. The Fc (Fragment crystallizable) region of the capture antibody is crucial for its immobilization on solid supports because it ensures the correct orientation of the antibody, leaving the Fab region free to interact with the antigen, enhances binding stability, reducing antibody detachment during washing steps and allows compatibility with a wide range of detection systems, including enzyme-linked, fluorescent, or electrochemical readouts.

A "detection/detector antibody" is an antibody used to recognize and bind to a specific target analyte in an immunoassay, typically following the capture of the analyte by a capture antibody. It is often conjugated to a detectable marker, such as an enzyme, fluorophore, or nanoparticle, to enable signal generation and quantification. Detection antibodies are crucial in sandwich ELISA, lateral flow assays, and immunohistochemistry (IHC), among other techniques.

As used herein, the term "conservative amino acid substitution" refers to a substitution of one amino acid by another within the same physicochemical class, wherein the substitution maintains the functional properties of the protein. Examples include substitutions among small hydrophobic residues (A, V, L, I), among aromatic residues (F, Y, W), among polar uncharged residues (S, T, C, N, Q), among positively charged residues (K, R, H), and among negatively charged residues (D, E). Such substitutions may occur within the complementarity-determining regions (CDRs) of an antibody while retaining antigen-binding specificity.

"Immunoassay device" refers to any analytical device, system, or platform configured to detect, quantify, or characterize one or more proteins or other antigens using specific antibody-antigen interactions. This term encompasses, without limitation, devices based on enzyme-linked immunosorbent assays (ELISA), chemiluminescence immunoassays, bead-based immunoassays (e.g., Luminex®), turbidimetric or nephelometric immunoassays, lateral flow immunoassays, microfluidic-based immunoassays, biosensors, and any other current or future immunoassay format employing antibodies or antibody fragments for target detection.

DETAILED DESCRIPTION OF THE INVENTION

The present invention is illustrated by means of the Examples set below without the intention of limiting its scope of protection.

Example 1. Antibodies Production

Recombinant monoclonal antibodies from chicken and rabbit hosts against MMP9 antigen were produced using HybriFree technology.

So, an innovative approach known as HybriFree technology has been used in the present invention to produce the antibodies. This method allows the production of monoclonal antibodies without relying on the traditional hybridoma technique.

Instead of fusing B cells with myeloma cells, as is done in conventional monoclonal antibody production, HybriFree takes a different path. The process begins with carefully immunizing chickens and rabbits with the MMP9 antigen. The immune systems of these animals respond by generating highly specific antibodies against the antigen. Each of these antibodies is a unique key designed to fit the molecular lock of MMP9, ensuring precise targeting.

Once the immune response has been activated, the scientists isolated the B cells responsible for producing these antibodies. But rather than keeping these cells alive, they extract the genetic instructions that encode the antibodies. These sequences hold the blueprint for manufacturing the antibodies outside the animal's body. With these genes in hand, researchers insert them into specially designed expression systems, such as mammalian cells, which serve as biofactories, faithfully producing recombinant monoclonal antibodies in a controlled environment.

The choice of chicken and rabbit hosts is not arbitrary. Chicken antibodies, known as IgY, have unique properties that make them particularly useful for detecting mammalian proteins. Rabbits, on the other hand, generate antibodies with exceptional affinity and specificity, making them invaluable for both research and therapeutic applications. By combining the strengths of these two species and harnessing the precision of recombinant DNA technology, the production of high-quality antibodies that can be used in diagnostic tests, biomedical research, and potentially even in therapies targeting diseases where MMP9 plays a role, is ensured.

With this approach, scientists have bypassed the limitations of traditional hybridoma methods, accelerating the development of customized antibodies while maintaining full control over their structure and production.

Example 2. Immunization

A total of two chickens (C23, C24) and two rabbits (R17, R18) were immunized with the MMP9-His antigen. Each test animal received 0.2 mg of antigen per injection, administered three times, followed by a final boost.

Chickens were immunized intramuscularly every 2 to 2.5 weeks.

Rabbits were immunized subscapularly every 3 to 3.5 weeks.

The first immunization was performed using Freund's Complete Adjuvant, while subsequent immunizations used Freund's Incomplete Adjuvant.

The specific antibody titer was measured via ELISA, using Nunc Maxisorp modules coated with MMP9-His or a non-relevant His-tagged protein. Immune response was assessed approximately 10 days after the third immunization from blood serum samples. All test animals exhibited a high immune response to the target antigen (1:256,000 to 1:1,024,000) but also showed cross-reactivity with the off-target protein (1:250 to 1:64,000).

Following the third immunization, chickens received a booster dose after two weeks, while rabbits were boosted after three weeks. Three days after the final boost, the spleens were harvested, homogenized, and cryopreserved in liquid nitrogen for further processing.

Example 3. Panning of Splenocytes and Generation of Full Antibody Libraries

A panning experiment for positive selection was performed using MMP9-His protein (5 µg/ml) immobilized on Nunc™ MaxiSorp™ 96-well plates. Splenocytes from immunized chickens (C23, C24, $2 \times 10^4$ cells per well) and rabbits (R17, R18, $4 \times 10^4$ cells per well) were used for B-cell enrichment, with a total of 48 panning reactions performed (12 samples per test animal).

For negative selection, rabbit splenocytes were first incubated for 15 minutes on an off-target protein (PIGR-His, 5 µg/ml), after which the unbound cells were transferred to on-target coated plates for selection. Chicken B-cells were directly transferred to on-target coated plates without a negative selection step. After 45 minutes of incubation, wells were extensively washed with PBS to remove unbound cells.

Next, RNA was isolated, and cDNA was synthesized using the SuperScript® IV First-Strand Synthesis System for RT-PCR (Invitrogen). The VH and VL regions were amplified using proprietary primers designed based on rabbit and chicken sequences stored in IMGT® and literature references:

Kodangatti S. et al. (2014)—Rabbit antibody repertoire analysis via NGS (MAbs, 6 (3): 628-36).

Lavinder J J. et al. (2014)—Systematic characterization of rabbit immunoglobulins (PLOS One, 9 (6)).

Kivi G. et al. (2016)—HybriFree method for monoclonal antibody development.

Amplified VH and VL sequences were purified, and 48 cloning reactions were performed using the Ligase Independent Cloning (LIC) method to insert them into a mouse IgG2a two-cassette expression plasmid. The resulting antibody library pools were grown in E. coli DH5a, and plasmid DNA was purified and transfected into CHOEBNALT85-1E9 cells for transient antibody production in serum-free media for 48-72 hours in a 24-well format.

Antibody mini pool culture supernatants were tested via ELISA for binding to MMP9-His (on-target) and a non-relevant His-tagged protein (off-target) (plates coated at 1 μg/ml in PBS).

A total of 39 ELISA-positive mini pools were identified. Onlyone mini pool exhibited cross-reactivity with the off-target protein.

Example 4. Expression of Full Antibody Library Clones, VH/VL Sequence Verification Single clones from 38 ELISA-positive antibody libraries were selected and cultured on LB-Amp solid medium. Colonies were expanded overnight in liquid culture under shaking conditions at 37° C. in 96-well microtiter plates (8×96-well plates).

Plasmid DNA was isolated and transfected into CHOEBNALT85-1E9 cells for transient antibody production. After 48-72 hours, culture supernatants were analyzed via ELISA using MMP9-His-coated plates.

A total of 34 ELISA-positive mIgG2a antibody clones specific to MMP9-His were identified and subjected to sequencing analysis, leading to the discovery of 15 unique anti-MMP9 antibody clones: 1A11, 1D1, 2B8, 2H4, 3C2, 4D9, 5C4, 6B11, 6D6, 7E10, 7H7, 8D8, 8G6, 8G12, and 8H6.

Example 5. Production of MMP9 Specific mIgG2a Antibodies in 6-Well Format 15 unique antibody clones were selected for further characterization. Plasmid miniprep DNA was isolated from the selected clones and subsequently transfected into CHOEBNALT85-1E9 cells for transient antibody production in a 6-well format using 2 mL of serum-free media per well.

After 72 hours of expression, the culture supernatants were evaluated for specific binding to MMP9-His via ELISA, confirming successful antibody production. Additionally, the full-length heavy and light chain sequences of the expressed antibodies were verified through Sanger sequencing, ensuring sequence integrity and confirming clonality.

Anti-MMP9 antibody clones were discovered in chicken and rabbit hosts. All 15 selected antibody clones remained ELISA-positive and displayed unique VH/VL sequences (with at least a 5 amino acid difference in all CDR regions) following miniprep DNA isolation and transfection (1A11 #1, 1D1 #2, 2B8 #4, 2H4 #6, 3C2 #8, 4D9 #12, 5C4 #13, 6B11 #15, 6D6 #16, 7E10 #18, 7H7 #20, 8D8 #21, 8G6 #22, 8G12 #23, and 8H6 #26).

Approximately 10 days post-transfection, cells were harvested by centrifugation (300 rcf for 5 minutes), and 1.0 mL of supernatant was carefully aliquoted into screw-top vials under sterile conditions.

The remaining supernatants were used for screening, including antibody concentration quantitation and epitope binning by Octet, and ELISA titer measurement to assess antibody binding characteristics.

The concentrations of the anti-MMP9 antibody clones in the 6-well supernatant ranged from 216 to 519 μg/mL.

All 15 isolated antibody clones exhibited specific binding to the on-target protein MMP9-His, with no cross-reactivity observed against the irrelevant His-tagged protein.

The antibody titers, as measured by ELISA, ranged from 16 to 32 ng/ml, indicating robust antibody production.

Example 6. Analysis of Anti-MMP9 Antibodies on the Octet System

Epitope binning using a classical sandwich format was performed to identify antibodies that function together as complementary pairs and could be deployed in a sandwich ELISA immunoassay. Epitope binning was conducted using the Octet RED96e System (Sartorius) with Anti-mouse IgG Fc Capture (AMC) biosensors (Sartorius). Prior to the experiment, AMC sensors were equilibrated offline in Sartorius' Octet® Kinetics buffer for 10 minutes. Cell culture supernatants containing a fixed concentration of antibodies (10 μg/mL), as determined by Octet, were used for the analysis.

Antibodies Tested: 1D1 #2, 3C2 #8, 4D9 #12, 5C4 #13, 7E10 #18, 7H7 #20, 8D8 #21, 8G6 #22, 8G12 #23

Sensor Type: Anti-mouse IgG Fc Capture (AMC, Sartorius)

Buffer: Kinetics buffer (PBS, 0.1% BSA, 0.02% Tween-20)

Procedure:
1. Baseline Monitoring: AMC sensors were initially monitored online for 30 seconds to establish the baseline in kinetics buffer (PBS, 0.1% BSA, 0.02% Tween-20).
2. Capture Antibody Loading: Sensors were then loaded with the first (capture) antibody supernatant diluted with kinetic buffer (10 μg/mL of antibody) for 600 seconds.
3. Baseline Re-establishment: After antibody loading, the sensors were transferred to a kinetics buffer for 30 seconds to re-establish the baseline.
4. MMP9-His Binding: The sensors were then exposed to MMP9-His (100 nM in kinetics buffer) for 200 seconds.
5. Baseline Re-establishment: Sensors were returned to the kinetics buffer for another 30-second baseline re-establishment.
6. Detection Antibody Loading: The sensors were loaded with the second (detection) antibody supernatant diluted with kinetic buffer (10 μg/mL of antibody) for 300 seconds.
7. Sensor Regeneration: After each detection step in the assay, AMC sensors were regenerated using glycine buffer (0.1 M, pH 1.7) followed by kinetics buffer, and the cycle was repeated for subsequent analyses.

3C2 #8, 4D9 #12, 5C4 #13, 7E10 #18, 7H7 #20, 8D8 #21, 8G6 #22, 8G12 #23 antibodies were tested in a pairwise combinatorial manner and categorized based on their epitope specificity ("epitope binning"). Those complementary pairs of antibodies that bound to separate epitopes without binding to one another and provided the highest signal in the assay were selected for further ELISA screening. The best-performing antibody pairs corresponded to 3C2 #8 as the first (capture) antibody in combination with 7E10 #18 as the second sandwich antibody (detection antibody).

Example 7. Results

The best performing pair was selected to further development.

Example 7.1. Capture MMP9 Antibody

MMP9_3C2 #8 antibody was selected as the capture antibody. Their Complementarity-Determining Regions (CDRs) are presented in the picture below.

The CDRs, designated H1, H2, and H3, are crucial segments in the variable region of the antibody's heavy chain that directly participate in antigen recognition and binding. These regions are part of the variable domain of the immunoglobulin, responsible for the diversity of antibody responses, and they interact specifically with an antigen's epitope. The CDRs of the antibody's heavy chain are as follows:

```
HCDR1 (SEQ ID NO: 5): GFTFSSHA

HCDR2 (SEQ ID NO: 6): IISSGSTP

HCDR3 (SEQ ID NO: 7): AKAADNGAGYNAAMIDA
```

The CDRs, designated L1, L2, and L3, are analogous to the heavy chain CDRs and are located in the variable light (VL) domain of an antibody. These regions, in conjunction with the heavy chain CDRs, form the antigen-binding site of the antibody, which is responsible for recognizing and binding to specific antigens. While the light chain plays a more supportive role in antigen recognition compared to the heavy chain, it is essential for overall antibody specificity, affinity, and functionality. The CDRs of the antibody's light chain are as follows:

```
LCDR1 (SEQ ID NO: 2): TYS

LCDR2 (SEQ ID NO: 3); DNT

LCDR3 (SEQ ID NO: 4); GSWDSSTAGI
```

Example 7.2. Epitope Mapping of MMP9_3C2 #8 Antibody

Epitope mapping for this antibody was outsourced for detailed analysis. The MMP9 antigen sequence was extended with neutral GSGSGSG linkers at both the N- and C-termini to prevent truncation of peptides. The extended antigen sequences were converted into 7, 10, and 13 amino acid peptides with peptide-peptide overlaps of 6, 9, and 12 amino acids, respectively.

Following on-chip peptide synthesis, the peptides were cyclized via a thioether linkage between a C-terminal cysteine and an appropriately modified N-terminus to maintain the structural integrity of the peptides.

The resulting conformational MMP9 (UniProt ID: P14780) peptide microarrays contained 2,163 distinct peptides, printed in duplicate (4,326 spots), and were flanked by additional HA (YPYDVPDYAG) control peptides (134 spots). The experimental conditions for the assay are as follows:

Washing Buffer: PBS, pH 7.4, with 0.005% Tween 20, washed for 2×10 sec after each incubation step.

Blocking Buffer: Rockland blocking buffer MB-070, incubated for 30 minutes prior to the first assay.

Incubation Buffer: Washing buffer supplemented with 10% blocking buffer.

Assay Conditions: Antibody concentrations of 1 µg/ml, 10 µg/ml, 30 µg/ml, and 50 µg/ml in incubation buffer, incubated for 16 hours at 4° C. with orbital shaking at 140 rpm.

Secondary Antibody: Goat anti-mouse IgG (H+L) DyLight680 (0.2 µg/ml), incubated for 45 minutes in incubation buffer at room temperature (RT).

Control Antibody: Mouse monoclonal anti-HA (12CA5) DyLight800 (0.2 µg/ml), incubated for 45 minutes in incubation buffer at RT.

Scanner: Innopsys InnoScan 710-IR Microarray Scanner, scanning resolution 20 µm, scanning gain of 50 at low laser power (680 nm, red) and 10 at high laser power (800 nm, green).

Assay Procedure:

1. Background Check: A copy of each conformational peptide microarray was incubated with the secondary antibody to assess potential background interactions with the cyclic-constrained peptides. This step ensured that no non-specific interactions would interfere with the main assays.

2. Main Assay: Additional conformational peptide microarrays were incubated with mouse antibody samples at concentrations of 1 µg/ml, 10 µg/ml, 30 µg/ml, and 50 µg/ml, followed by staining with both the secondary and control antibodies. Read-out was performed using the Innopsys InnoScan 710-IR Microarray Scanner.

3. Control Peptides: The additional HA peptides framing the peptide microarrays were stained with the control antibody as part of internal quality control to confirm assay performance and ensure the integrity of the peptide microarrays.

Data Analysis:

Quantification of the spot intensities was performed using 16-bit grayscale TIFF files, which provide a higher dynamic range than the 24-bit colorized TIFF files displayed in the report. PepSlide® Analyzer software was used to process microarray image data. The software algorithm breaks down the fluorescence intensities of each spot into raw, foreground, and background signals (refer to the "Raw Data" tabs). The analysis then calculates averaged median foreground intensities and the spot-to-spot deviations of spot duplicates. Intensity maps were generated, and interactions in the peptide maps were highlighted using a color code where red indicates high intensity and white indicates low intensity.

A maximum spot-to-spot deviation of 40% was tolerated, with any spots exhibiting higher deviations marked with a value of zero. This could be manually flagged as either "Artifact" or "Valid."

For visualization, the averaged spot intensities of the assays were plotted against the antigen sequences of MMP9, spanning from the N-terminus to the C-terminus. This enabled the visualization of overall spot intensities and the signal-to-noise ratios. These intensity plots were compared with peptide and intensity maps and visually inspected for the identification of antibody epitopes.

When it was unclear whether a particular amino acid was part of the interaction motif, the corresponding letter was written in gray. Single-peptide interactions were considered atypical and were noted in italics. For clarity, the baselines of the intensity plots were adjusted upward.

Background Interactions:

A preliminary conformational MMP9 peptide microarray was incubated with the secondary antibody (goat anti-mouse IgG DyLight680) to investigate possible background interactions with the cyclic-constrained MMP9 peptides. This step was crucial to identify any non-specific binding that could interfere with the main assays.

After enhancing the brightness and contrast of the data, we observed several very weak background interactions with the secondary antibody, primarily involving basic peptides. These interactions were likely due to non-specific ionic antibody binding.

The very weak background interactions were quantified and accounted for in the subsequent analysis of the main antibody assays.

Example 7.3. Secondary Antibody-MMP9

The incubation of a conformational MMP9 peptide microarray with mouse IgG2 MMP9_3C2 #8 at a concentration of 1 µg/ml was followed by staining with both secondary and control antibodies (red=sample staining, green=control staining).

A strong response was observed against an epitope-like spot pattern formed by adjacent peptides sharing the common motif TFLGKEY, present across all peptide lengths. This indicates a specific and prominent interaction between the antibody and this epitope.

The background interactions from the secondary antibody were negligible, demonstrating high signal-to-noise ratios. This was further validated by the well-defined staining of HA control peptides (green), which confirmed the integrity of the assay.

Example 7.4. Detector MMP9 Ab

The MMP9_7E10 #18 antibody was selected as the detector antibody for the assay. The CDRs of this antibody are illustrated in the image below.

The CDRs of the antibody's heavy chain are as follows:

```
HCDR1 (SEQ ID NO: 11): GFSFSRGDW
HCDR2 (SEQ ID NO: 12): IYTDNSGS
HCDR3 (SEQ ID NO: 13): ARGDTNYHWNL
```

The CDRs of the antibody's light chain are as follows:

```
LCDR1 (SEQ ID NO: 8): QNIYSN
LCDR2 (SEQ ID NO: 9): DAS
LCDR3 (SEQ ID NO: 10): QCTYYDSAT
```

Example 7.5. MMP9 Antigen

Expression Vector: pQMCF-1.2-HC-MCS #7

The expression vector pQMCF-1.2-HC-MCS #7 is used for the transient expression of the target protein. This vector contains essential elements for efficient transcription and translation in mammalian cells. Specifically, it features the HC (heavy chain) domain for antibody production and a multiple cloning site (MCS), which allows the insertion of various genes or sequences of interest. The #7 refers to a specific variant or construct in a series, each of which may have slight modifications to optimize expression.

Expression Cell Line: HEK 293 ALL

The HEK 293ALL cell line is a well-established human cell line commonly used for recombinant protein production. It is a derivative of the HEK 293 cells, known for their high transfection efficiency, making them ideal for transient protein production. The ALL variant may refer to specific enhancements in the cell line that optimize protein production or stability.

Production Type: Transient

The transient production method involves the transient transfection of the expression vector into the HEK 293ALL cells. In this approach, the cells are temporarily introduced to the plasmid DNA containing the gene of interest, and they produce the protein for a short period, usually lasting from 48 to 72 hours. Unlike stable cell lines, transient expression does not involve the integration of the plasmid into the cell's genome.

The antigen sequence is as follows (SEQ ID NO: 18):

```
MSLWQPLVLVLLVLGCCFAAPRQRQSTLVLFPGDLRTNLTDRQLAEEYL
YRYGYTRVAEMRGESKSLGPALLLLQKQLSLPETGELDSATLKAMRTPR
CGVPDLGRFQTFEGDLKWHHHNITYWIQNYSEDLPRAVIDDAFARAFAL
WSAVTPLTFTRVYSRDADIVIQFGVAEHGDGYPFDGKDGLLAHAFPPGP
GIQGDAHFDDDELWSLGKGVVVPTRFGNADGAACHFPFIFEGRSYSACT
TDGRSDGLPWCSTTANYDTDDRFGFCPSERLYTQDGNADGKPCQFPFIF
QGQSYSACTTDGRSDGYRWCATTANYDRDKLFGFCPTRADSTVMGGNSA
GELCVFPFTFLGKEYSTCTSEGRGDGRLWCATTSNFDSDKKWGFCPDQG
YSLFLVAAHEFGHALGLDHSSVPEALMYPMYRFTEGPPLHKDDVNGIRH
LYGPRPEPEPRPPTTTTPQPTAPPTVCPTGPPTVHPSERPTAGPTGPPS
AGPTGPPTAGPSTATTVPLSPVDDACNVNIFDAIAEIGNQLYLFKDGKY
WRFSEGRGSRPQGPPFLIADKWPALPRKLDSVFEERLSKKLFFFSGRQVW
VYTGASVLGPRRLDKLGLGADVAQVTGALRSGRGKMLLFSGRRLWRFDV
KAQMVDPRSASEVDRMFPGVPLDTHDVFQYREKAYFCQDRFYWRVSSRS
ELNQVDQVGYVTYDILQCPEDGSGHHHHHH
```

The confirmed epitope for the capture antibody is underlined: TFLGKEY (SEQ ID NO: 1).

Example 7.6. MMP9 ELISA development

The biomaterials described above were used to develop an in-house sandwich ELISA immunoassay for detecting endometrial cancer in a gynecological fluid, preferably uterine or cervical fluid. For the MMP9 antigen, a pair of specific recombinant monoclonal antibodies were selected: one for capture and the other as the detector antibody. The detector antibodies were biotinylated, with the biotin/protein ratio determined using commercial kits and following the provided protocols.

The sandwich complex (capture antibody/analyte/detection antibody-biotinylated) is detected using a Streptavidin-HRP conjugate (horseradish peroxidase enzyme). A commercial TMB (3,3',5,5'-Tetramethylbenzidine) substrate kit, which includes all necessary reagents for the colorimetric detection step, is used to generate a measurable signal. The TMB chromogen reacts with HRP, producing a blue color. Upon adding a stop solution, the reaction halts and the color shifts from blue to yellow, which is quantified at 450 nm using a microplate reader.

The intensity of the color is directly proportional to the amount of MMP9 present in the sample. The ELISA plates are pre-coated and can be stored at 2-8° C. for up to three months. A 2% sucrose solution is used in the coating process to enhance the stability of the pre-coated plates.

Example 7.7. ELISA plates coating process

ELISA plates are coated with a solution of 1 μg/mL of MMP9_3C2 #8 in Carbonate Buffer (0.05M, pH 9.6). A volume of 100 μL of the coating solution is added to each well and incubated at 2-8° C. overnight. After the incubation with the capture antibody, the plate is washed three times with 300 μL of PBS (pH 7.4) containing 0.05% Tween 20 per well. The plate is then blocked with 100 μL of 1% BSA-PBST for 1 hour. After blocking, the plate is washed three times with washing buffer.

To enhance stability, the plates are incubated overnight with PBS containing 2% sucrose in a humidity chamber with controlled humidity (20-30%). After overnight incubation, the plates are washed three times and stored at 2-8° C. in a plastic bag with a silica gel pouch. The pre-coated plates retain stability for up to 3 months when stored at 2-8° C.

Example 7.8. ELISA immunoassay protocol

ELISA Protocol is as follows:
1. Prepare an eight-point calibration curve by performing serial dilutions of standard material at 8 ng/ml of MMP9, using PBS as the blank.
2. Add 100 μL of MMP9 standards, MMP9 controls, and a gynecological fluid, preferably uterine or cervical fluids samples to each well of a precoated ELISA plate. The recommended dilution for samples is 1:200.
3. Incubate the plate for 1 hour at 37° C. with shaking.
4. Wash the plate three times with 350 μL of wash buffer (PBST).
5. Add 100 μL of biotinylated Detector Antibody (MMP9_7E10 #18) at 100 ng/ml to each well.
6. Incubate the plate for 1 hour at 37° C. with shaking.
7. Wash the plate three times with 350 μL of wash buffer (PBST).
8. Add 100 μL of Streptavidin-HRP at 0.1 μg/mL to each well.
9. Incubate the plate for 30 minutes at 37° C. with shaking.
10. Wash the plate three times with 350 μL of wash buffer (PBST).
11. Add 100 μL of substrate (TMB, Pierce).
12. Incubate the plate for 15 minutes at room temperature in the dark, without shaking.
13. Add 100 μL of stop solution (2M H2SO4).
14. Read the plate at 450 nm within 15 minutes.

Example 8. Method for the diagnosis

An immunoassay comprising the antibodies of the invention has been used for the quantification of MMP9 in the liquid fraction of a uterine aspirate, obtained by pipelle biopsy. Pipelle biopsies are obtained by blind uterine aspiration with a soft, straw-like device that suctions the content of the uterine cavity. The specimen obtained is also called uterine aspirate. It is complex liquid sample expected to contain cells from the endometrium. The uterine aspirate is processed by adding an amount of PBS and centrifuging.

Figure 1:
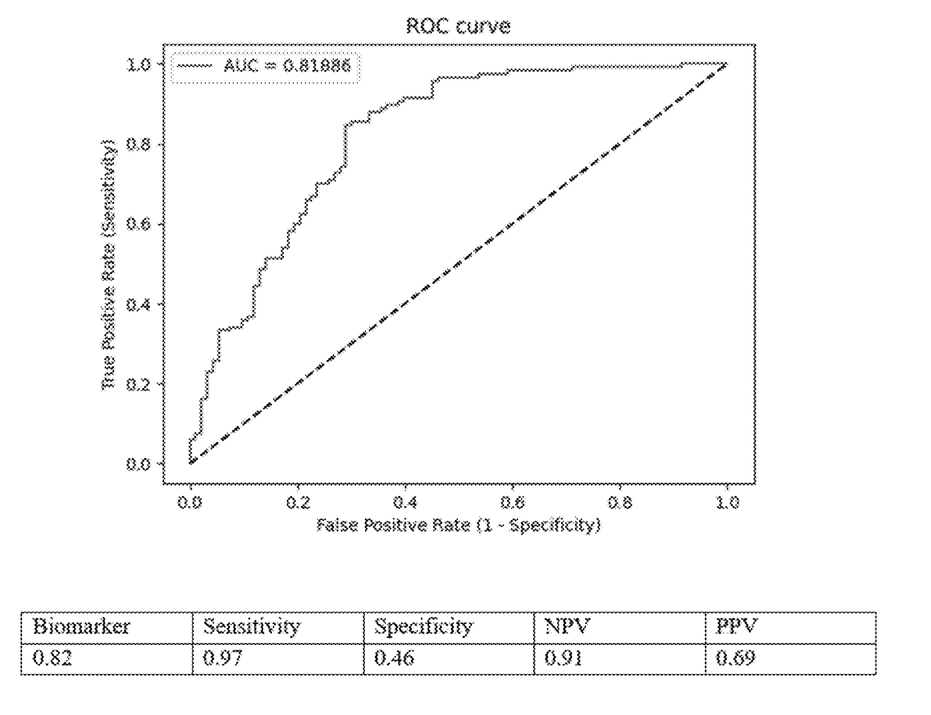
FIG. 1. ROC curve (AUC of 0.82), indicating a strong diagnostic power, obtained after the analysis of a cohort of 210 samples (93 Benign+117 Endometrial cancer) to quantify the presence of MMP9 in gynecological fluid, specifically in uterine fluid.

A cohort of 210 samples (93 Benign+117 Endometrial cancer) have been used to quantify the presence of MMP9 in gynecological fluid, specifically in uterine fluid. The ROC curves give an AUC of 0.82, indicating a strong diagnostic power (FIG. 1).

---

The invention claimed is:

1. An immunoassay test device or kit comprising:
(a) a capture antibody that specifically binds an epitope of the MMP9 protein, wherein the antibody comprises: a light chain variable region (VL) comprising the complementarity-determining regions LCDR1, LCDR2, and LCDR3; and a heavy chain variable region (VH) comprising the complementarity-determining regions HCDR1, HCDR2, and HCDR3, wherein LCDR1 is SEQ ID NO: 2, LCDR2 is SEQ ID NO: 3, LCDR3 is SEQ ID NO: 4, HCDR1 is SEQ ID NO: 5, HCDR2 is SEQ ID NO: 6, and HCDR3 is SEQ ID NO: 7;
(b) a detection antibody that specifically binds an epitope of the MMP9 protein; and
(c) a solid support.

2. The immunoassay test device or kit, according to claim 1, wherein the detection antibody comprises: a light chain variable region (VL) comprising the complementarity-determining regions LCDR1, LCDR2, and LCDR3; and a heavy chain variable region (VH) comprising the complementarity-determining regions HCDR1, HCDR2, and HCDR3, wherein LCDR1 is SEQ ID NO: 8, LCDR2 is SEQ ID NO: 9, LCDR3 is SEQ ID NO: 10, HCDR1 is SEQ ID NO: 11, HCDR2 is SEQ ID NO: 12, and HCDR3 is SEQ ID NO: 13.

3. The immunoassay test device or kit, according to claim 1, wherein the capture antibody is immobilized on the solid support and the detection antibody is labelled for signal detection.

4. The immunoassay test device or kit, according to claim 1, wherein the detection antibody is labeled or conjugated to an enzyme, a fluorophore, a colored synthetic polymer particle, or a colloidal metal particle.

5. The immunoassay test device or kit, according to claim 1, wherein the detection antibody is labeled with a reporter molecule selected from the group comprising: biotin, an enzyme, a fluorophore, or a radioactive isotope.

6. The immunoassay test device or kit, according to claim 1, further comprising a secondary antibody that binds the detector antibody.

7. An isolated antibody that specifically binds an epitope of the MMP9 protein, the isolated antibody comprising: a light chain variable region (VL) comprising the complementarity-determining regions LCDR1, LCDR2, and LCDR3; and a heavy chain variable region (VH) comprising the complementarity-determining regions HCDR1, HCDR2, and HCDR3, wherein LCDR1 is SEQ ID NO: 2, LCDR2 is SEQ ID NO: 3, LCDR3 is SEQ ID NO: 4, HCDR1 is SEQ ID NO: 5, HCDR2 is SEQ ID NO: 6, and HCDR3 is SEQ ID NO: 7.

8. An isolated antibody that specifically binds an epitope of the MMP9 protein, the isolated antibody comprising: a light chain variable region (VL) comprising the complementarity-determining regions LCDR1, LCDR2, and LCDR3; and a heavy chain variable region (VH) comprising the complementarity-determining regions HCDR1, HCDR2, and HCDR3, wherein LCDR1 is SEQ ID NO: 8, LCDR2 is SEQ ID NO: 9, LCDR3 is SEQ ID NO: 10, HCDR1 is SEQ ID NO: 11, HCDR2 is SEQ ID NO: 12, and HCDR3 is SEQ ID NO: 13.

9. The isolated antibody according to claim 7, wherein the isolated antibody specifically binds to an epitope of the MMP9 protein, wherein the epitope comprises the amino acid sequence set forth in SEQ ID NO: 1.

10. The isolated antibody according to claim 7, wherein the antibody is a conventional antibody or a recombinant antibody.

11. The isolated antibody according to claim 10, wherein the antibody is a monoclonal antibody.

12. The isolated antibody, according to claim 8, wherein the antibody is a conventional antibody or a recombinant antibody.

13. The isolated antibody according to claim 12, wherein the antibody is a monoclonal antibody.

* * * * *